Aug. 17, 1943.   J. H. MANSFIELD   2,327,279
SCREW MACHINE
Filed June 1, 1942   6 Sheets-Sheet 1
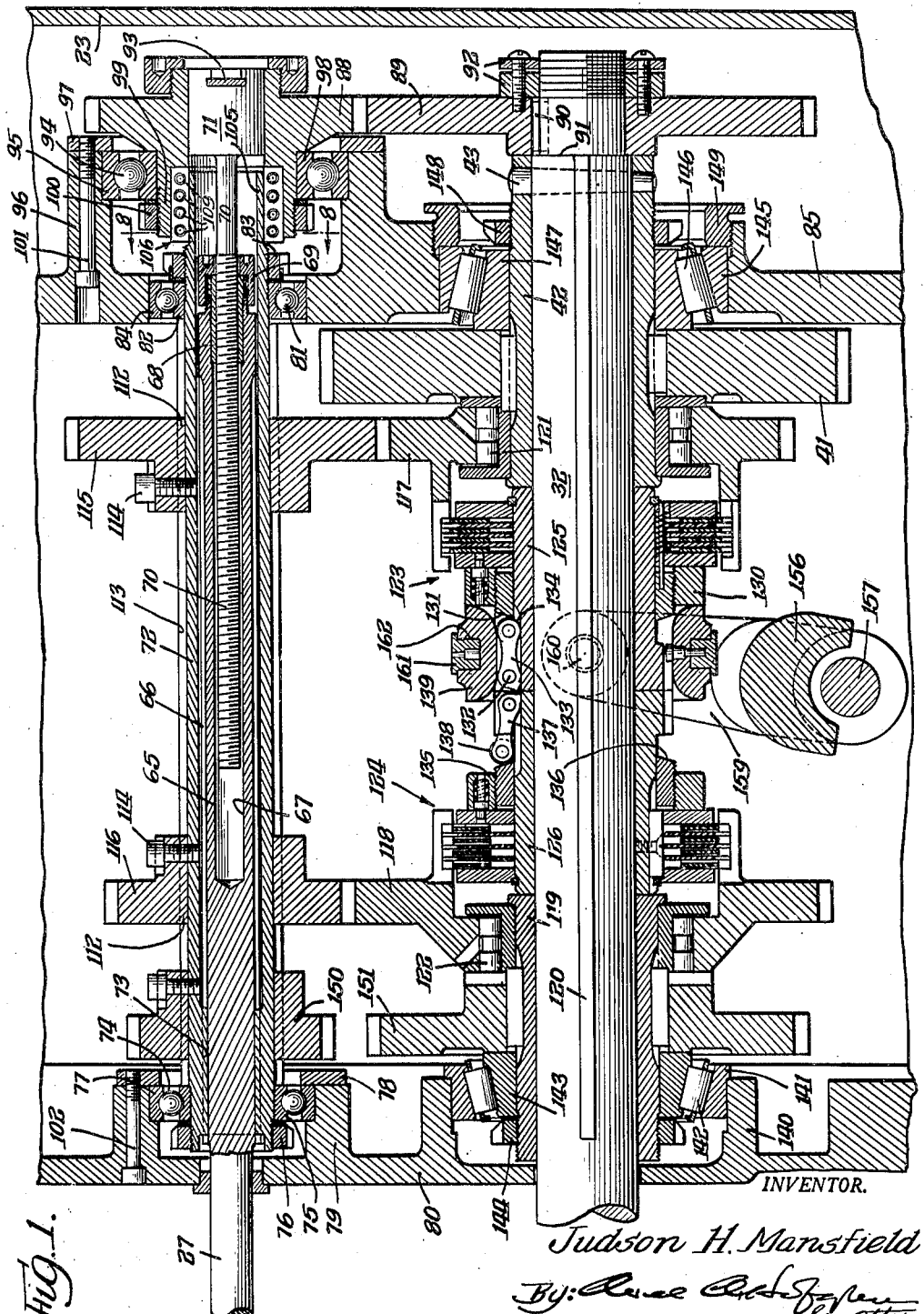
INVENTOR.
Judson H. Mansfield
By: [signature]
his atty.

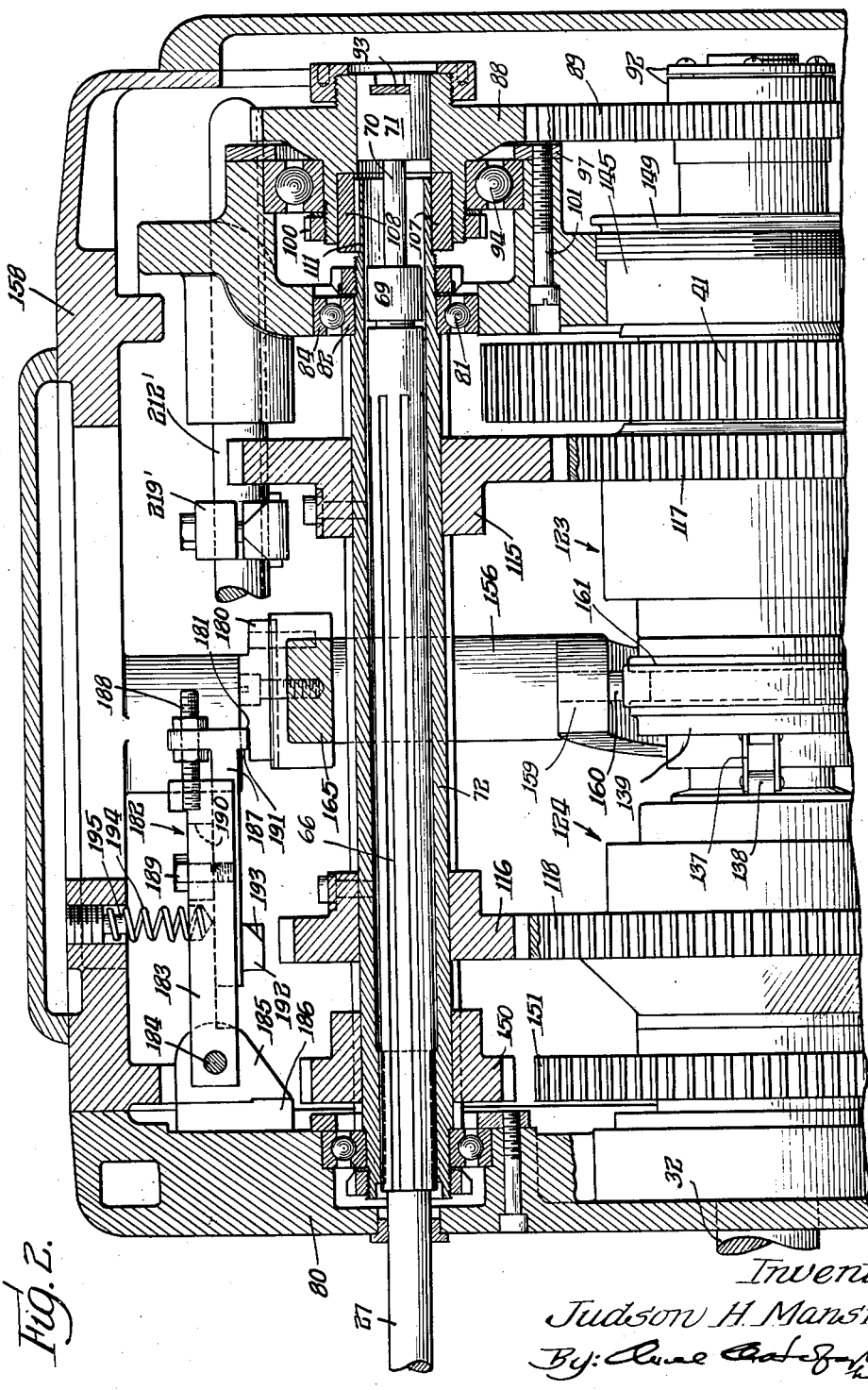

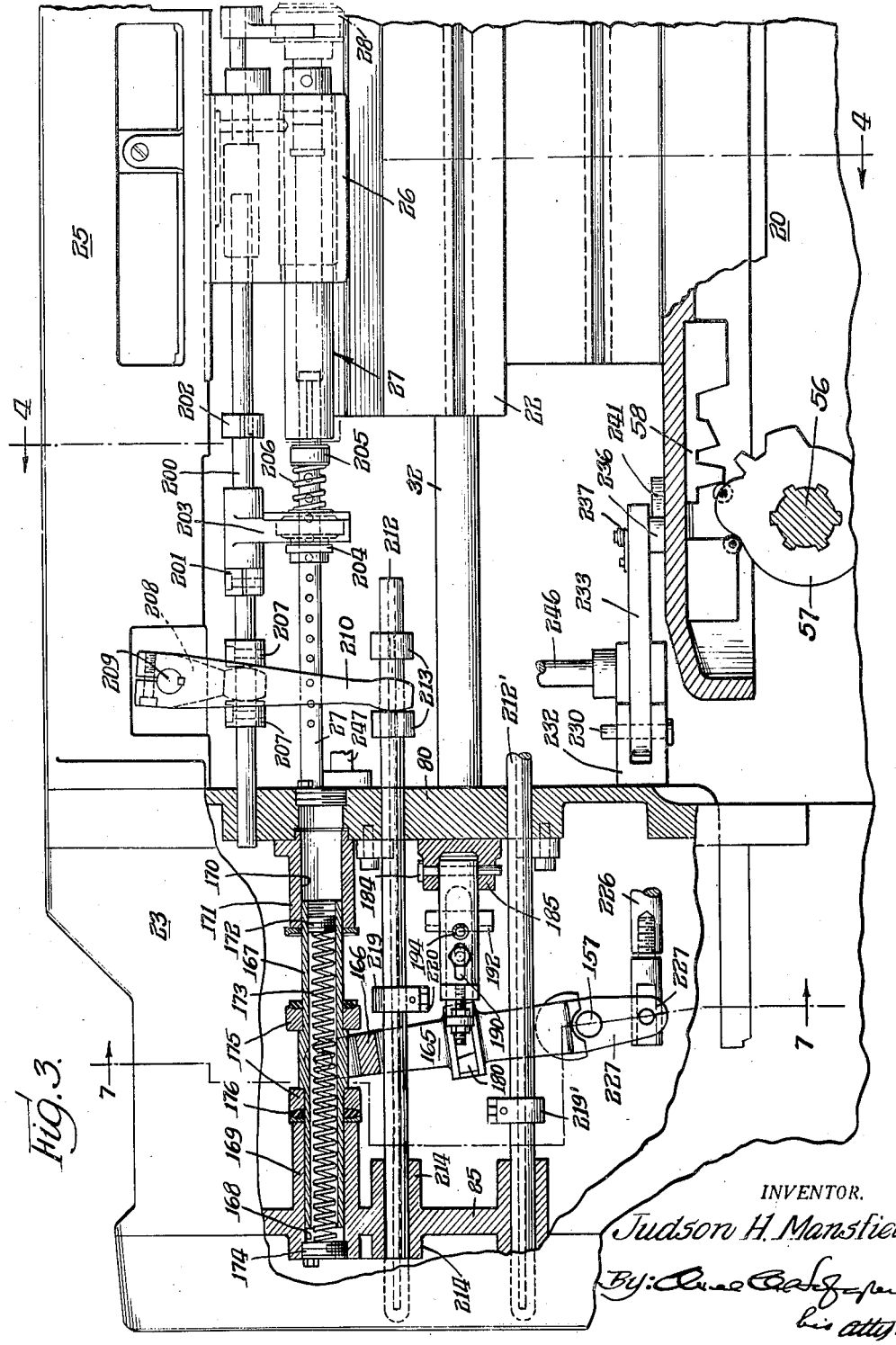

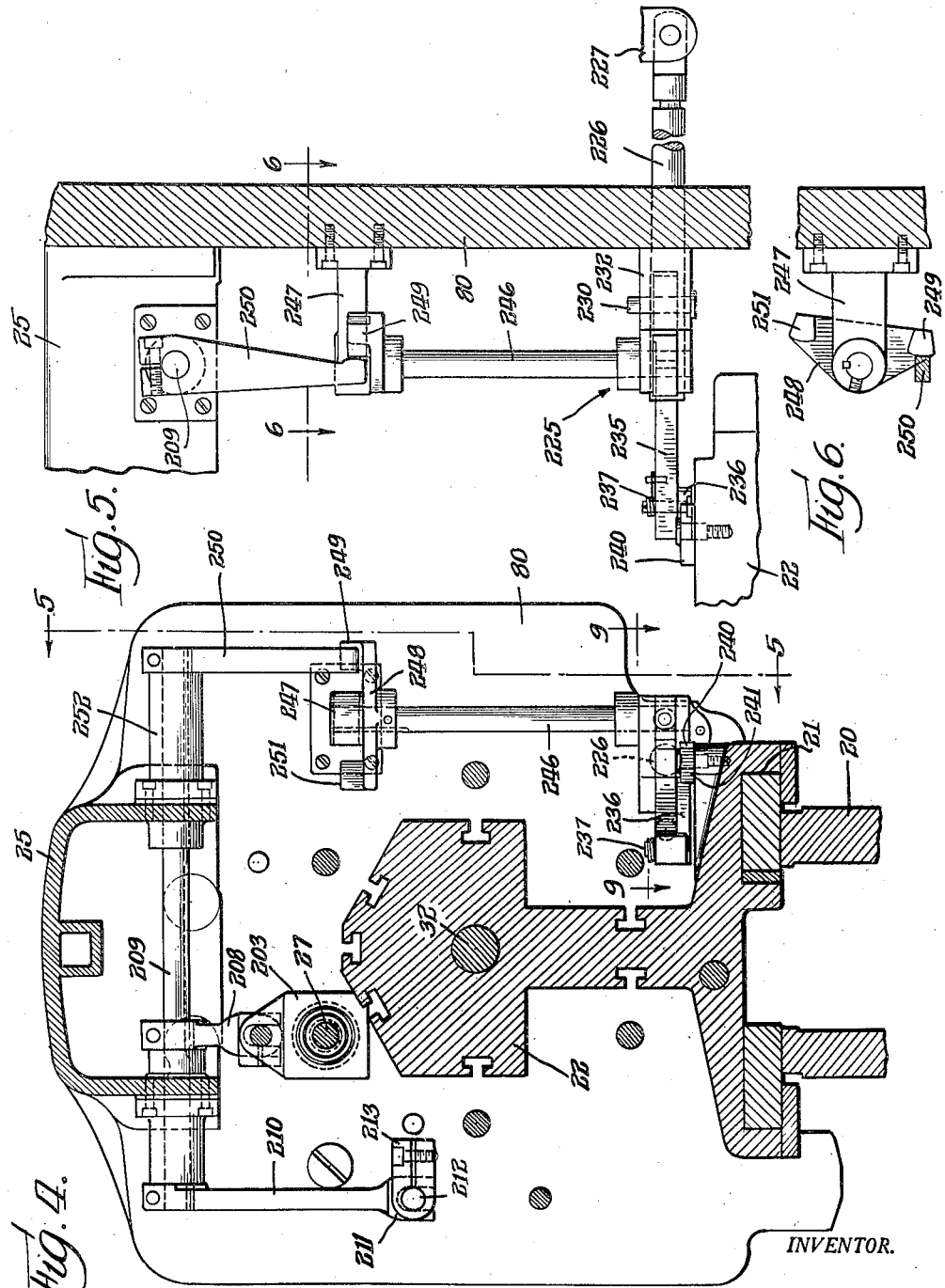

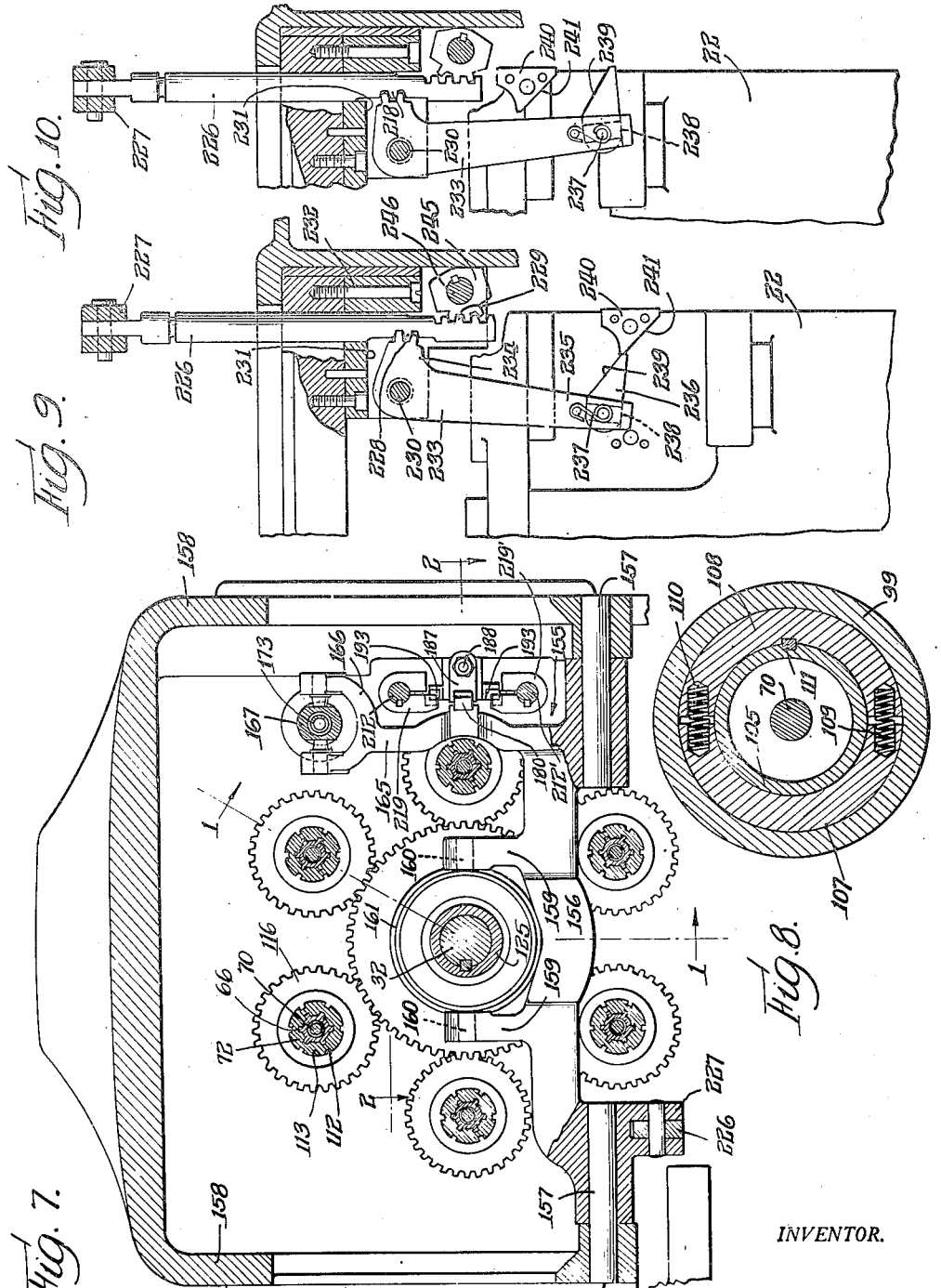

Patented Aug. 17, 1943

2,327,279

UNITED STATES PATENT OFFICE 2,327,279

SCREW MACHINE

Judson H. Mansfield, Rockford, Ill., assignor to Greenlee Bros. & Co., Rockford, Ill., a corporation of Illinois Application June 1, 1942, Serial No. 445,329

24 Claims. (Cl. 10—130)

The invention relates generally to automatic screw machines and more particularly to the thread cutting means thereof.

One object of the invention is to provide a new and improved screw machine by the provision of new and improved drive means and control means for the tap or die carrying spindle.

Another object is to provide in an automatic screw machine driving means for the tap or die carrying spindle that is simplified yet capable of operating smoothly and quietly at high speeds.

Another object is to provide, in an automatic screw machine having a work or stock spindle, a tool spindle frictionally rotated at the speed of the work spindle and means for rotating the spindle at a speed above or below the work spindle speed.

Another object is to provide, in an automatic screw machine having a work spindle and a tool spindle, means for driving the tool spindle to rotate at the speed of the work spindle and alternatively operable clutches to rotate the tool spindle at a speed above or below the work spindle, the clutches and drive means for the tool spindle being constructed to permit speedy and continuous transition from drive by one clutch to drive by the other without pause at the point when both clutches are disengaged.

A further object is to provide new and improved control means for the tool spindle driving means.

Still a further object is to provide, in a screw machine having a pair of clutches for driving a tool spindle, control means including a load and fire device potentiated by engagement of one of the clutches and released under the control of the tool spindle but thereafter operating under its own stored energy to disengage the one and engage the other clutch.

Other objects and advantages will become apparent from the following detailed description taken in connection with the accompanying drawings, in which:

Fig. 1 is an enlarged and partial longitudinal sectional view through the tail end or spindle casing of a multiple-spindle, automatic screw machine, taken approximately along the line 1—1 of Fig. 7.

Fig. 2 is a view partially in plan and partially in section through the spindle casing, taken approximately along the line 2—2 of Fig. 7. The spindle shown in section is not the spindle shown in Fig. 1, but a spindle identical therewith in construction.

Fig. 3 is a rear elevational view of the tailstock end of the machine with a part of the spindle casing in section better to reveal certain internal construction.

Fig. 4 is a transverse sectional view taken approximately along the line 4—4 of Fig. 3.

Fig. 5 is a fragmentary detail view of certain control mechanism, taken approximately along the line 5—5 of Fig. 4.

Fig. 6 is a fragmentary detail view taken along the line 6—6 of Fig. 5.

Fig. 7 is a transverse sectional view through the spindle casing, taken approximately along the line 7—7 of Fig. 3.

Fig. 8 is an enlarged transverse sectional view taken approximately along the line 8—8 of Fig. 1.

Fig. 9 is a fragmentary detail view taken approximately along the line 9—9 of Fig. 4, and showing the mechanism in one operative position.

Fig. 10 is a view similar to Fig. 9 showing the mechanism in a different operative position.

Figure 11:
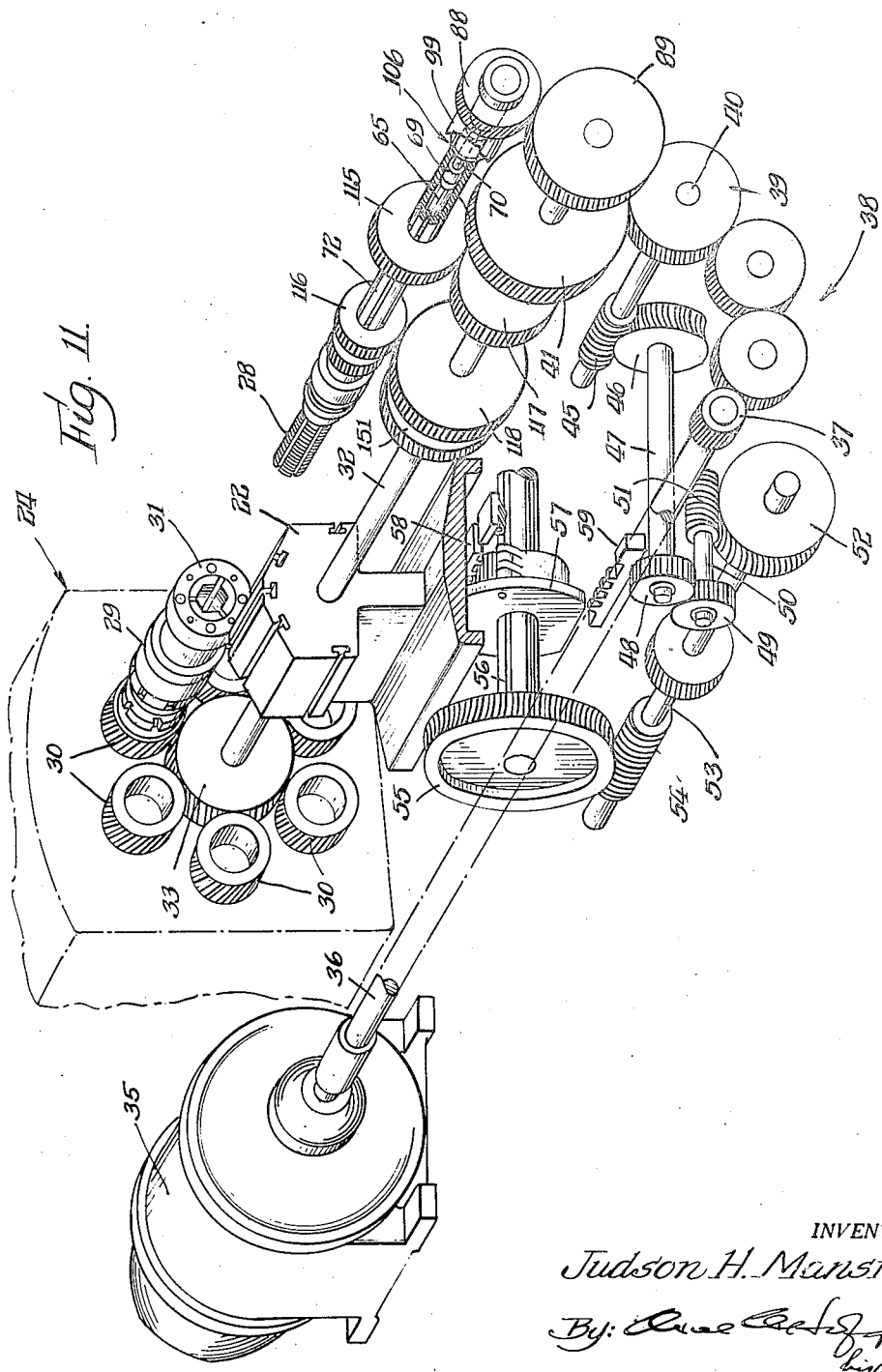
Fig. 11 is a view in perspective and somewhat diagrammatic of the drive train for certain parts of the machine.

While the invention is susceptible of various modifications and alternative constructions, it is shown in the drawings and will hereinafter be described as embodied in an automatic screw machine. It is not intended to limit the invention to the specific construction disclosed, but to cover all modifications and alternative constructions falling within the spirit and scope of the invention as defined in the appended claims.

For purposes of disclosure, the invention is here shown as embodied in a multiple-spindle, automatic screw machine. Such a machine has a bed 20 formed with ways 21 (Fig. 4) extending longitudinally thereof and upon which is reciprocable a slide 22 (Figs. 3, 4 and 11). At one end, normally the right hand or tail end, as viewed from the front of the machine, the bed 20 supports a casing 23 which houses certain spindle actuating mechanism and will thus hereinafter be referred to as the spindle casing. Extending from the spindle casing 23 toward the headstock, diagrammatically indicated at 24 in Fig. 11, is an overarm 25, and depending from this overarm near the middle thereof is a bored bracket 26 the purpose of which will presently be made known.

As above stated, the machine disclosed herein is a multiple-spindle machine, such multiplicity of spindles, six to be exact, is shown in Fig. 7. However, inasmuch as all of the spindles associated with the spindle casing 23 are of identical construction and inasmuch as this invention is applicable equally to a single or a plurality of spindles, only a single spindle is shown, in other than Fig. 7, in order to clarify the views. Accordingly, there is shown as projecting from the spindle casing 23 in Fig. 3 a single spindle, generally designated 27, which projects through and is thus rotatably and reciprocably supported near its outer end in the bracket 26. This spindle 27 is adapted at its outer or right hand end, as viewed in Fig. 3, to carry a suitable tool 28, usually either a thread cutting die or tap, and will thus hereinafter be referred to as the tool spindle.

The headstock 24 is, as will be readily understood by those skilled in the art, formed with a plurality of spindles, equal in number and axially aligned with the spindles in the spindle casing 23. One such spindle 29 is shown diagrammatically in Fig. 11, and also shown in that same figure are gears 30, one for each of the plurality of spindles 29. Each spindle 29 is, of course, provided with a suitable chuck 31 for holding a work piece and these spindles will, for convenience in differentiating from the spindles 27, hereinafter be referred to as work holding spindles.

The tool spindle 27 carrying the tool 28 is rotated and is also reciprocated toward and from the work supported in the spindles 29 of the headstock, so as to cut appropriate threads on the work piece. This invention contemplates the provision of new and improved actuating means for the tool spindle 27 and new and improved control means for these tool spindle actuating means. These new features of the machine will now be described with such references to the general operation of the machine and to other parts of the machine as may be necessary for a proper understanding of this invention.

As best seen in Fig. 11, there extends longitudinally of the machine from end to end thereof a single shaft 32 (see also Fig. 3) which herein constitutes the main drive shaft for both the work supporting spindles 29 and the tool spindles 27. To that end, the shaft 32 has non-rotatably secured thereon near its left end, as viewed in Fig. 11, a gear 33 that meshes with each of the gears 30 so as to drive simultaneously and at the same speed all of the spindles 29. At its right hand end, the shaft 32 carries suitable means presently to be described in detail for actuating the tool spindles. The main shaft 32 is driven from a motor 35 through a suitable drive train including a longitudinally extending shaft 36 having a small gear 37 fast on the end thereof, suitable speed change gears indicated at 38, culminating in a gear 39 fast on a stub shaft 40, and a gear 41 (see Fig. 1) keyed to a short sleeve 42 surrounding the main shaft 32 and in turn made rotatable with the shaft by a diametrically extending pin 43. Also driven to be actuated in timed relationship with the spindles 29 and the spindles 27 is the slide 22. The drive for the slide 22 commences with the stub shaft 40 and includes a worm 45 on the end of the shaft 40, worm wheel 46, shaft 47, change gears 48 and 49, shaft 50, worm 51, worm wheel 52, shaft 53, worm 54, worm wheel 55, shaft 56, and segmental gear 57 adapted to engage successively with racks 58 and 59 formed on the slide 22. It is believed apparent from this construction that, as the shaft 32 rotates to drive spindles 27 and 29, slide 22 will first be advanced, then remain in its advanced position during a dwell period, and thereafter be returned to initial position, such movement constituting one cycle of operation of the machine.

Within this cycle of operation the spindle 27 is fed forward to cut the threads on the work piece and again returned to its initial starting position. The provision of mechanism to effect this operation positively and quickly, yet smoothly and without shock, is a prime object of this invention, and such mechanism will now be described. The tool spindle 27 at its right hand end, as viewed in Fig. 1, extends into the spindle casing 23 and at that end has a portion 65 formed externally with longitudinally extending splines 66, and internally is formed with a bore 67. At its extreme end, the portion 65 of the spindle 27 carries internally thereof a nut 68 held in the spindle by means of a screw cap 69 threaded onto a reduced, threaded flange on the portion 65. Extending within the bore 67 and engaged by the nut 68 is a lead screw 70 terminating at its outer or right hand end, as viewed in Fig. 1, in an enlarged hub 71. Surrounding the portion 65 of the spindle 27 is an elongated sleeve 72 which at its left hand end, as viewed in Fig. 1, is formed with splines 73 cooperating with the splines 66 of the spindle 27 so as to rotate in unison with the spindle but to permit reciprocation of the spindle longitudinally relative to the sleeve. The sleeve 72 is rotatably supported at its left hand end in a ball bearing 74 the inner race 75 of which is retained on the sleeve by a nut 76 and the outer race 77 of which is retained by a ring 78 in an annular flange 79 projecting inwardly from the inner end wall 80 of the casing 23. Near its right hand end, the sleeve 72 is similarly supported in a ball bearing 81 the inner race 82 of which is retained on the sleeve by a nut 83 and the outer race 84 of which is retained in a right hand end wall 85 of the casing 23.

The lead screw 70 is continuously driven at the same speed and in the same direction, herein counterclockwise, as viewed from the right in Fig. 1, as the work supporting spindles 29. For convenience, this speed will hereinafter be referred to as the normal or intermediate speed. Such rotation is imparted to the lead screw 70 by a positive geared drive including a gear 88 non-rotatably secured on the enlarged hub 71 and a gear 89 non-rotatably secured by a key 90 on the extreme right hand end of the main shaft 32. The gear 89 is retained against movement longitudinally of the shaft 32 by bearing against a shoulder 91 formed on the shaft 32 and by nuts 92 threaded onto the end of the shaft. Gear 88 is non-rotatably secured on the hub 71 of the lead screw by a diametrically extending pin 93 and is rotatably supported to in turn support one end of the lead screw 70 in a ball bearing 94. The outer race 95 of the ball bearing is retained in an outwardly extending annular flange 96 by a ring 97, while the inner race 98 is retained on an inwardly projecting annular flange 99, formed on the gear 88, by a nut 100 threaded onto the flange. The ring 97, as well as the ring 78, is secured in any convenient manner, herein by elongated bolts 101 and 102, respectively, extending through and concealed within the flanges 96 and 79.

With the lead screw 70 constantly rotated at a normal or intermediate speed, and with the lead screw and the spindle 27 interconnected through the medium of the nut 68, and with the spindle and the sleeve 72 interconnected through the medium of the splines 66, 73, it will be readily understood that variation in the relative speeds of the lead screw and the sleeve 72 will cause longitudinal movement of the spindle 27. Thus, when the lead screw and the sleeve 72 are rotated at the same speed, no longitudinal shift of the spindle will take place. However, if the sleeve and hence the spindle is rotated slower than the lead screw, the spindle will be advanced toward the work supporting spindles, that is, to the left in Fig. 1, and, inasmuch as the work supporting spindle is rotating in a counterclockwise direction, the tool on the end of the spindle 27 will cut a right hand thread on the work blank supported in the spindle 29. Conversely, if the sleeve 72 is rotated faster than the lead screw 70, the spindle 27 will be withdrawn or backed off and thus disengaged from the threaded work blank.

To impart these relative speeds to the sleeve 72 and hence to the spindle 27, three drive trains are provided between the main shaft 32 and the sleeve 72. Of these drive trains, the one for rotating the sleeve and the spindle at the same rate as the lead screw 70 includes a permanently engaged frictional driving means capable of transmitting the relatively small amount of force required to rotate the sleeve and the spindle at the normal or intermediate speed. To that end, the sleeve 72 at its right hand end is formed with an extension 105 that projects within and in radially spaced relation to the annular flange 99 formed on the gear 88. Interposed between the extension 105 and the flange 99 is the frictional drive, generally designated 106. As best seen in Fig. 8, this drive means is composed of a collar split into semi-circular parts 107 and 108, urged apart by a plurality of compression springs 109 seated in recesses 110 formed in the ends of the collar parts. One of the parts 108 is non-rotatably secured to the extension 105 of the sleeve 72 by a key 111 with the frictional engagement of the parts with the gear 88 relied upon for the transmission of rotational force from the gear to the collar. The gear 88 is a steel gear, while the collar is made of bronze.

The trains for rotating the sleeve 72 at a speed above or below the speed of rotation of the lead screw 70 are positive trains, capable of overriding the frictional drive means 106. To that end, there is non-rotatably secured on the sleeve 72 a gear 115 and a smaller gear 116. The gears are non-rotatably held by engagement of internal splines 112 on the gears with external splines 113 on the sleeve 72 and are held against axial movement by set screws 114. The gear 115 meshes with a gear 117 freely rotatable on the sleeve 42, to which is keyed the main drive gear 41. Likewise, gear 116 meshes with a gear 118 freely rotatably mounted on a short sleeve 119 surrounding the shaft 32 and non-rotatably held by a key 120. Preferably, roller bearings 121 and 122 are interposed, respectively, between the gear 117 and the sleeve 42, and the gear 118 and the sleeve 119. Gear 118 will, of course, be larger than gear 117, and the ratios of the gears 115, 117 and 116, 118 will be so proportioned relative to one another and relative to the ratio between the gears 88 and 89 as to rotate the sleeve 72 at a speed lower than the lead screw when the gears 115, 117 are effective, and at a higher speed when the gears 116, 118 are effective.

The gears 117 and 118 form parts of disk clutches 123 and 124, respectively. Complementary clutch parts of the clutch 123 are non-rotatably mounted upon a short sleeve 125 surrounding and in turn non-rotatably held on the main shaft 32 by the key 120. Complementary parts for the clutch 124 are non-rotatably mounted on a similar sleeve 126 surrounding and non-rotatably held on the main shaft 32 by the key 126. Surrounding and longitudinally slidable on the sleeve 125 is a compound ring 130 having suitable engagement with the complementary clutch means mounted on the sleeve 125 and having a beveled cam surface 131. Pivotally secured by a pin 132 to the sleeve 125 is a short link 133 extending longitudinally of the sleeve and carrying at its other end a roller 134 for engaging the cam surface 131. Clutch 124 similarly is provided with a compound ring 135 having a beveled cam surface 136 and a link 137 having a roller 138. The clutches are so disposed that the links 133 and 137 occupy adjacent ends of the sleeves 125 and 126 so as to be alternatively operable by an annular ring 139 disposed in surrounding relation to the adjacent ends of the sleeves and shiftable longitudinally by means later to be described from engagement with one link to engagement with the other. The inner surface of the ring 139 is rounded so that upon engagement with one of the rollers the roller will be forced inwardly and in turn, by its action on one of the beveled cam surfaces, will shift the compound ring longitudinally to effect engagement of that particular clutch. Ring 139 is a primary control member, as will soon appear.

The shaft 32, like the sleeve 72, is supported in the walls 80 and 85 of the casing 23. To that end, the wall 80 is formed with an inwardly extending annular flange 140 supporting within it the outer race 141 of a roller bearing 142. The inner race 143 of the roller bearing is carried by the sleeve 119 and retained in position by a nut 144 threaded on the end of the sleeve. The wall 85 is provided with an aperture in which is received the outer race 145 of a roller bearing 146, the inner race 147 of which is carried by the sleeve 42 and retained by a nut 148 threaded onto the end of the sleeve. An annular ring 149 threaded into the end wall 85 aids in retaining the outer race 145 of the bearing in position. Non-rotatably secured to the sleeve 72 is a gear 150, and non-rotatably secured to the sleeve 119 is a gear 151 which form parts of a drive train for the spindle 27 when the same is to be employed for drilling or some other operation other than thread cutting.

Having described the mechanism for rotating and reciprocating the spindle 27, the control means for the mechanism will now be described. Forming a principal part of this control means is a shifter fork, generally designated 155 (Fig. 7). This shifter fork has a main portion 156 disposed horizontally and transversely of the casing 23 and pivoted at either end on pins 157 projecting inwardly from the side walls 158 of the casing. Extending upwardly from the horizontal portion 156 intermediate the ends thereof are fingers 159 in which are trunnioned diametrically projecting pins 160 of an annular collar 161 received in a peripheral groove 162 formed in the ring 139 (see Figs. 1, 2 and 7). At the right end, as viewed in Fig. 7, the shifter fork is formed with an upstanding arm 165 forming part of a latching end of a load and fire device. The arm 165 terminates in a bifurcated end 166 engaging a sleeve 167 (see Figs. 3 and 7) forming part of the load and fire device. The sleeve is reciprocable at one end in a bore 168 formed by a tubular extension 169 projecting inwardly from the wall 85 and is reciprocable at the other end in a bore 170 formed by a tubular member 171 secured to the wall 80. One end of the sleeve 167 is closed by a plug 172 against which bears one end of a compression spring 173 disposed within the sleeve, the other end of which bears against a plug 174 closing the bore 168 in the tubular extension 169. On either side of the point of engagement of the arm 165 with the sleeve, the sleeve carries collars 175 that are adapted to abut the ends of the tubular extension 169 and tubular member 171, and thus serve as stops limiting the shift of the sleeve 167.

Each collar 175 preferably is faced with a rubber washer 176 serving to eliminate the noise and the shock incident to contact of the collars 175 with the tubular extension or member. It will be noted that the compression spring 173 acts to shift the sleeve 167 to the right, as viewed in Fig. 3, and thus to rock the shifter fork in a clockwise direction, as viewed in Fig. 3. In Fig. 1, such rocking of the shifter fork is counterclockwise and hence in a direction to effect engagement of the clutch 124 and thus operation of that drive train, rotating the spindle 27 at a speed higher than the speed of rotation of the lead screw 70.

In order that the arm 165 may form part of a latching device, as above stated, it carries a latch block (Fig. 2) 180 that is formed with a notch or shoulder 181. Adapted to cooperate with the latch block 180 is a latch, generally designated 182, composed of a main part 183 pivoted at one end by a pin 184 between ears 185 of a lug 186 secured to the wall 80. An auxiliary part 187 is secured for adjustment longitudinally of the main part 183 by means of a screw 188 and a bolt 189 operating in a slot 190. The auxiliary part 187 has a slight lateral projection 191 at its outer end for engaging the shoulder 181 of the latch block, while at its inner end it is provided with a block 192 extending transversely beyond the margins of the latch. This block 192 is, over the length to which it extends beyond the margins of the latch 182, beveled on the face adjacent the lateral projection 191 to form cam surfaces 193 (see Figs. 2 and 7). The latch is constantly urged toward the latch block 180 by a compression spring 194 bearing at one end in a socket formed in the main part 183 and at the other end surrounding and bearing against a plug 195 threaded into the side wall 158 of the casing 23.

The latch device just described serves to hold the shifter fork 155 in the position shown in the drawings against the action of the compression spring 173. The position of the shifter fork is that in which the clutch control ring 139 causes clutch 123 to be engaged and thus causes rotation of the spindle 27 at a speed lower than the speed of the lead screw 70, with a resultant advance of the spindle as already described. Withdrawal of the latch 182 to release the shifter fork to the action of the spring 173 is effected under the control of the spindle 27. To that end there is disposed above and parallel with the spindle 27 a control rod 200 guided for reciprocatory movement at one end in the wall 80 and at the other end in the bracket 26. Adjustably clamped on the rod 200 are a first pair of collars 201 and 202. Slidable on the rod 200 intermediate the collars 201 and 202 is a dog 203 movable longitudinally with the spindle 27 but permitting rotation of the spindle relative thereto. This dog is disposed on the spindle 27 between collars 204 and 205 and normally retained abutting the collar 204 by means of a compression spring 206 interposed between the dog and the collar 205. Rod 200 carries a second set of collars 207 and disposed between these collars is a short, bifurcated arm 208 non-rotatably secured on a rock shaft 209 extending transversely of and journaled in the overarm 24. At its left hand outer end, as viewed in Fig. 4, shaft 209 carries non-rotatably thereon a substantially longer depending arm 210 terminating in a bifurcated end 211. This bifurcated end of the arm 210 straddles a rod 212 between a pair of collars 213 fixed thereon. The rod 212 is supported for axial shifting movement by the wall 80 and the wall 85 of the casing 23. Wall 85 is preferably formed with tubular extensions 214 extending in both directions from the wall so as to provide a lengthened bearing surface for the rod 212. Adjustably mounted on the rod 212 within the casing 23 is a dog 219 having a beveled cam surface 220 (see Fig. 3) disposed to engage the cam surface 193, upon appropriate movement of the rod 212, to thereby cam the latch 182 outwardly away from the latch block 180 and release the shifter fork to the spring 173. Such release of the shifter fork occurs when the dog 203 in response to advance movement of the spindle 27 engages the collar 202 and thus shifts the control rod 200 to the right, as viewed in Fig. 3. Such shift of the control rod through the arm 208, rock shaft 209, and arm 210 shifts the rod 212 and thereby causes the dog 219 to engage the block 192 and withdraw the latch 182. Such release is, of course, timed to take place when the tool spindle 27 has advanced the desired amount.

In Fig. 3 there is shown a duplicate rod 212' carrying a dog 219', the rod and dog being in all respects similar to the rod 212 and provided for use should a lower one of the spindles 27 be employed as the control spindle. Inasmuch as the block 192 extends below the latch 182 as well as above, it will be apparent that the latch is adapted to be actuated from this lower dog 219' to release the shifter fork without necessity of any change in construction or even adjustment. This lower rod 212', together with the dog 219' is shown somewhat enlarged in the enlarged view Fig. 2. A better conception of the dog and particularly of the cam surface provided may thus be had by reference to this view.

The shifter fork is initially rocked to the position shown in the drawings, namely, to cause engagement of the clutch 123 and to cock or potentiate the load and fire device under the control of the slide 22. It is restored to neutral position, that is, with both clutches 123 and 124 disengaged, under the control of the spindle 27, with both the spindle 27 and the slide 22 acting through a common motion translating means, generally designated 225. This device shown primarily in Figs. 4 to 6, 9 and 10, comprises a rod 226 pinned at one end to the end of a downwardly projecting arm 227 of the shifter fork 155. At its other end, this rod is provided on opposite sides with rack teeth 228 and 229. Pivoted on a vertically disposed pin 230 in a recess 231 in a block 232, secured within the bed 20 of the machine, is a crank 233 having a short arm 234 terminating in a segmental pinion meshing with the rack teeth 228. This crank has a longer arm 235 carrying at its free end a pivoted dog 236. This dog is by a spring 237 constantly urged in a clockwise direction, as viewed in Figs. 9 and 10, to the position shown, and is restrained against further movement in that direction by abutment with a depending lug 238 on the underneath side of the arm 235. The edge of the dog 236 facing toward the pin 230 is beveled to form a cam surface 239. Engageable with this cam surface is a dog 240 carried by the slide 22. This dog is provided with a complementary beveled cam surface 241 and upon engagement with the dog 236 when the slide is moving forwardly, that is, downwardly, as viewed in Fig. 9, will cam the crank 233 in a clockwise direction thereby shifting the rod 226 in a direction rocking the shifter fork to effect engagement of the clutch 123 and cocking of the load and fire device. During return movement of the slide 22, engagement of the dog 236 by the dog 240 merely pivots the dog 236, permitting the dog 240 to ride by without swinging the crank 233.

Cooperatively engaging the rack teeth 229 is a segmental pinion 245 keyed to the lower end of a vertically disposed shaft 246. The shaft is journaled at its lower end in the block 232 and at its upper end in a bracket 247. Near its upper end the shaft 246 has non-rotatably secured thereto a generally triangular plate 248 with the shaft passing through the plate near the apex thereof. Upstanding from the outside base corner of the plate, as viewed in Fig. 4, is a lug 249 disposed in the path of the lower end of an arm 250 fixed on the rock shaft 209. During the retraction of the spindle 27 the dog 203 strikes the collar 201 on the control rod 200, thereby rocking the shaft 209 in a clockwise direction, as viewed in Fig. 3. Consequently in Fig. 5, which is a view opposite to Fig. 3, the arm 250 will be swung in a counterclockwise direction, thereby striking lug 249 and rocking shaft 246 in a counterclockwise direction, as viewed in Figs. 6 and 9. As a result, the rod 226 will again be pulled downwardly, as viewed in Figs. 9 and 10, that is, to the right in Fig. 3, rocking the shifter fork to restore the clutch control ring to neutral position wherein both clutches 123 and 124 are disengaged.

The plate 248 is adapted for employment without change in the cutting of left hand threads. To that end, there extends upwardly from the opposite base corner a lug 251 similar to the lug 249, and the rock shaft 209 is provided with a removable spacer sleeve 252 which when removed permits the arm 250 to be shifted inwardly to a position where it will engage the lug 251 and thus rock the shaft 246 opposite to the direction rocked when the arm engages the lug 249.

For a better and more ready understanding of the interrelation of the driving mechanism and the control mechanism just described, the operation of the screw machine for the cutting of right hand threads will be briefly set forth. For that purpose, let it be assumed that the machine and the various parts thereof are in the positions that would be taken just prior to commencement of operation on a new set of work blanks. Under those circumstances, both clutches 123 and 124 would be disengaged, the slide 22 would be in the position shown in Fig. 10, and the plate 248 would still be in the position shown in Fig. 6. Under these conditions, the sleeve 72 is driven through the frictional drive means 106 and thus is rotated at the same speed as the lead screw 70. As a consequence, the spindle 27 remains stationary in so far as its axial position is concerned. As the slide 22 moves forwardly to commence a new cycle of operation, the dog 240 strikes the dog 236 and rocks crank 233 in a clockwise direction shifting rod 226 downwardly to the position shown in Fig. 9, thereby rocking shifter fork 155, to the position shown in the various figures, engaging clutch 123.

In such rocking of the shifter fork 155, the latch block 180 is carried beyond the end of the latch 182, permitting the same, under the influence of the spring 194, to drop in front of the shoulder 181 on the latch block and thus hold the shifter fork in this position against the tendency of the load and fire device and of any other means to shift the same to some other position. The sleeve 72 is now positively driven through gears 117 and 115, and this positive drive will, of course, overcome or override the frictional drive means 106. Due to the gear ratio between the gears 117 and 115, the spindle 72, though still rotated in a counterclockwise direction, as viewed from the right in Fig. 1, is rotated at a slower rate than the lead screw 70. Similarly, the spindle 72 is rotated at a slower rate than the work supporting spindle 29, and thus relative to both the lead screw 70 and the work supporting spindle 29 has a clockwise rotation. In consequence, the nut 68 and hence the spindle 27 will be fed forwardly, that is, to the left, as viewed in Fig. 1, to cause engagement of the tool carried by the spindle with the work blank. With such feeding of the tool, right hand threads will be formed on the work blank, for, as stated, the tool is rotating clockwise relative to the work blank.

As the spindle 27 advances, it carries with it its dog 203 which ultimately strikes collar 202 of the control rod 200 and shifts the control rod to the right, as viewed in Fig. 3, to rock the rock shaft 209 and the arms, particularly 210, rigid therewith. Swinging of the arm 210 in turn causes shift of the rod 212 with resultant engagement of the cam surface 220 of the dog 219 with the cam surface 193 of the block 192 of latch 182. As a result, latch 182 is cammed outwardly releasing the shifter fork to actuation by the load and fire device. As a result, clutch control ring 139 is shifted from the position shown in Fig. 1 directly and without pause through neutral position to a position overlying roller 138 to effect engagement of the clutch 124. The provision of the frictional drive means for rotating the sleeve 72 at an intermediate speed and of disk clutches for driving the sleeve at the lower or the higher speed makes possible this direct transition from the lower to the higher speed without a pause or dwell at the intermediate speed and without noise, danger of tooth breakage or other disadvantages inherent in the employment of toothed clutches. It is well to remember at this point that rocking of the shaft 209 by engagement of the dog 203 with the collar 202 results in a swinging of arm 250 away from the plate 248. Thus when by the rocking of the shifter fork the plate 248 is rotated in a clockwise direction as viewed in Fig. 6 no interference between the arm 250 and the lug 249 occurs.

With the clutch 124 now engaged, the sleeve 72 and hence the spindle 27 are rotated at a speed higher than the rotation of the lead screw 70 and of the work supporting spindle 29. As a consequence, the spindle 27 and its nut 68 have a counterclockwise rotation relative to the lead screw 70 and relative to the work blank. The spindle 27, therefore, and the thread cutting tool carried thereby will thus be gradually backed off and the spindle returned to its innermost or normal or initial position. As the spindle is retracted, dog 203 will engage collar 291 on the control rod 200 and thus rock the rock shaft 209 in a counterclockwise direction, as viewed in Fig. 5. The arm 250 then will engage lug 249 and will rotate shaft 246 in a counterclockwise direction, as viewed in Fig. 6, and will thus, through the rack and pinion connection, draw the rod 226 downwardly to the position shown in Fig. 10. The shifter fork will thus be rocked in a direction to disengage the clutch 124. When the clutch control ring 139 reaches its neutral position drive of the sleeve 72 will have been restored to the frictional driving means 106, with the result that further movement of the spindle will be arrested as well as further rocking of the shifter fork. The parts will thus remain in this neutral position.

It is believed apparent from the foregoing that there has been provided vastly improved actuating mechanism for the spindle and vastly improved control means for the actuating means. The construction of the actuating mechanism is extremely simple with little that can get out of running order. The employment of the frictional drive means 106 and of the frictional disk clutches 123 and 124 makes possible quick and rapid shifting without noise or shock to the mechanism, and makes possible a shift directly from one speed through the intermediate speed to the other speed without necessity of a pause at the intermediate speed or neutral position of the clutch control ring. This mechanism further eliminates the necessity of hair line adjustments to assure that the teeth of the clutches will mesh at the proper time and without injury.

I claim as my invention:

1. In a screw machine, a lead screw, means continuously rotating the lead screw, a spindle rotatably and reciprocably mounted and having a nut threadedly engaging said lead screw, and means adjustable for rotating said spindle at different rates to hold the same axially stationary or shift the same longitudinally relative to said lead screw including a constantly engaged frictional drive means which, when operating alone, rotates said spindle at the same speed and in the same direction as said lead screw and thus holds the spindle axially stationary.

2. In a screw machine, a rotatably mounted lead screw, means continuously rotating said lead screw, a spindle rotatably and reciprocably mounted and having a nut threadedly engaging said lead screw, means including a constantly engaged frictional drive means which, when operating alone, rotates said spindle at the same speed and in the same direction as the lead screw to hold the spindle against axial movement, and means selectively engageable with the spindle and rotating said spindle at a speed below that of said lead screw, to produce axial movement of the spindle in one direction, or at a speed above that of said lead screw, to produce axial movement of the spindle in the opposite direction.

3. In a screw machine, a rotatably mounted lead screw, means continuously rotating said lead screw, a spindle rotatably and reciprocably mounted and having a nut threadedly engaging said lead screw, means including a constantly engaged frictional drive means which, operating alone, rotates said spindle at the same speed and in the same direction as said lead screw, a first drive train including a frictional clutch capable of overcoming said frictional drive and rotating said spindle slower than said lead screw and a second drive train including a frictional clutch capable of overcoming said frictional drive and rotating said spindle faster than said lead screw.

4. In a screw machine, a rotatably mounted lead screw, means continuously rotating said lead screw, a spindle rotatably and reciprocably mounted and having a nut threadedly engaging said lead screw, means including a constantly engaged frictional drive means which, operating alone, rotates said spindle at the same speed and in the same direction as said lead screw, a first drive train including a normally disengaged frictional clutch operable upon engagement to overcome said frictional drive and rotate said spindle slower than said lead screw, a second drive train including a normally disengaged frictional clutch operable upon engagement to overcome said frictional drive and rotate said spindle faster than said lead screw, and means for selectively causing engagement of one or the other of said clutches.

5. In a screw machine, a rotatably mounted lead screw, means rotating said lead screw at a constant speed, a spindle having a nut threadedly engaging said lead screw, a sleeve rotatably mounted and having a splined connection with said spindle to impart rotation thereto while permitting movement of the spindle longitudinally thereof, means including a constantly engaged frictional drive means which, when operating alone, rotates said sleeve at the same rate and in the same direction as the lead screw to hold the spindle against axial shift, and normally disengaged means operable upon engagement to override said frictional drive means and rotate said sleeve at a speed higher or lower than the speed of the lead screw to advance or retract the spindle, said last mentioned means including a pair of selectively engageable friction clutches.

6. In a screw machine, a drive shaft, a rotatably mounted sleeve, a spindle received partially within the sleeve and supported thereby, a connection between said sleeve and spindle causing said spindle to rotate with the sleeve while permitting movement of the spindle longitudinally thereof, a rotatably mounted lead screw, a nut carried by said spindle threadedly engaging said lead screw, and means for rotating and reciprocating said spindle comprising a geared connection between said shaft and said lead screw to rotate the latter at a constant speed, a constantly engaged frictional drive means between said geared connection and said sleeve to drive the latter at the same speed and in the same direction as said lead screw, a drive train between said shaft and said sleeve including a normally disengaged clutch and operable when the clutch is engaged to rotate said sleeve slower than said lead screw, a second drive train between said shaft and said sleeve including a normally disengaged clutch and operable when the clutch is engaged to rotate said sleeve faster than said lead screw, and means for selectively causing engagement of one or the other clutch.

7. In a screw machine, a drive shaft, a rotatably mounted sleeve, a spindle received partially within the sleeve and supported thereby, a connection between said sleeve and spindle causing said spindle to rotate with the sleeve while permitting movement of the spindle longitudinally thereof, a rotatably mounted lead screw, a nut carried by said spindle threadedly engaging said lead screw, and means for rotating and reciprocating said spindle comprising a geared connection between said shaft and said lead screw which rotates the latter at a constant speed, a constantly engaged frictional drive means between said geared connection and said sleeve which drives the latter at the same speed and in the same direction as said lead screw, a pair of drive trains between said shaft and said sleeve, each including a gear fast on said sleeve, a gear rotatable on said shaft and a frictional clutch for locking the last mentioned gear for rotation with said shaft, one of said drive trains being operable to rotate said sleeve slower than said lead screw, and the other being operable to rotate said sleeve faster than said lead screw, and means governing engagement of said clutches.

8. In a screw machine, a rotatably mounted lead screw, a spindle having a nut threadedly engaging said lead screw, a rotatably mounted sleeve surrounding a portion of said spindle supporting the same for rotation with the sleeve and for longitudinal movement relative to the sleeve, means for rotating the lead screw including a gear non-rotatably secured on the lead screw, means for rotating said sleeve at the same rate as said lead screw to hold the spindle against longitudinal movement relative to said lead screw including a frictional drive means non-rotatably secured to said sleeve and yieldably engaging said gear, and means for overcoming said frictional drive means to rotate said sleeve slower or faster than said lead screw to effect axial shift of said spindle in opposite directions.

9. In a screw machine, a rotatably mounted lead screw, means for rotating the lead screw including a gear non-rotatably secured on the lead screw and having an axially projecting annular flange, a spindle having a nut threadedly engaging said lead screw, a rotatably mounted sleeve surrounding a portion of said spindle supporting the same for rotation with the sleeve and for longitudinal movement relative to the sleeve and projecting at one end within the annular flange on said gear in radial spaced relation thereto, and frictional drive means for rotating said sleeve at the same rate as said lead screw interposed between said sleeve and said annular flange comprising a first part non-rotatably held relative to said sleeve, and a second part yieldably urged into constant engagement with said annular flange, and means for overcoming said frictional drive means to rotate said sleeve slower or faster than said lead screw to effect axial shift of said spindle in opposite directions.

10. In a screw machine, a spindle rotatably and reciprocably mounted, and means for rotating and reciprocating said spindle including a constantly engaged frictional drive means which, when operating alone, rotates said spindle at an intermediate speed, a first drive means capable of overcoming said frictional drive and rotating said spindle at a lower speed including a frictional clutch, and a second drive means capable of overcoming said frictional drive and rotating said spindle at a higher speed including a frictional clutch.

11. In a screw machine, a spindle rotatably and reciprocably mounted, and means for rotating and reciprocating said spindle including a constantly engaged frictional drive means which, when operating alone, rotates said spindle at a particular speed, and additionally engageable means overriding said frictional drive and rotating said spindle at a different speed.

12. In a screw machine, a spindle rotatably mounted, means including a constantly engaged frictional driving connection which, when operating alone, rotates said spindle at an intermediate speed, and additional driving means overriding said frictional driving connection and selectively rotating said spindle at a speed higher or a speed lower than the intermediate speed, said last mentioned means including a pair of alternately engageable disk clutches.

13. In a screw machine, a reciprocably mounted slide, means for reciprocating said slide, a rotatable spindle mounted for axial sliding movement, driving means for advancing or retracting said spindle, and means for governing said spindle driving means comprising means actuated by said slide during the approach movement thereof to initiate advance of said spindle, and means controlled by said spindle operable after a predetermined advance of said spindle to cause said driving means to retract said spindle and operable upon return of said spindle to arrest operation of said driving means.

14. In a screw machine, a reciprocably mounted slide, means for reciprocating said slide, a rotatable spindle mounted for axial sliding movement, driving means for advancing or retracting said spindle, and means for governing said driving means comprising a control member having a neutral position wherein the driving means is ineffective to advance or retract said spindle, a position to one side of neutral wherein the driving means is operative to advance the spindle, and a position to the other side of neutral wherein the spindle driving means is operative to retract the spindle, a load and fire device operable to shift said control member from its spindle advancing position through neutral to its spindle retracting position in a single uninterrupted movement, means actuated by said slide to position said control member in its spindle advancing position and to cock said load and fire device, a latch for holding said member in its spindle advancing position, means governed by said spindle for releasing said latch and placing said control member under the control of said load and fire device after a predetermined advance of said spindle, and means actuated by said spindle upon return thereof to starting position to return said control member to neutral position.

15. In a screw machine, a reciprocably mounted slide, means for reciprocating said slide, a rotatable spindle mounted for axial sliding movement, means for advancing said spindle, means for retracting said spindle, and means for governing said spindle advancing and retracting means comprising a control member having a neutral position wherein both spindle shifting means are inoperative, a position to one side of neutral wherein the spindle advancing means is operative, and a position to the other side of neutral wherein the spindle retracting means is operative, a load and fire device operable to shift said control member from its spindle advancing position through neutral to its spindle retracting position, means actuated by said slide to position said control member in its spindle advancing position and to cock said load and fire device, a latch for holding said member in its spindle advancing position, means governed by said spindle for releasing said latch, and means governed by said spindle for returning said control member to neutral position.

16. In a screw machine, a reciprocably mounted slide, means for reciprocating said slide, a rotatable spindle mounted for axial sliding movement, means for advancing said spindle including a clutch, means for retracting said spindle including a clutch, and means for governing said clutches comprising a control member having a neutral position wherein both clutches are disengaged, a position to one side of neutral wherein a clutch is engaged causing advance of the spindle, and a position to the other side of neutral wherein a clutch is engaged causing a retraction of the spindle, a load and fire device operable to shift said control member from its spindle advancing position through neutral to its spindle retracting position, means actuated by said slide to position said control member in its spindle advance position and to cock said load and fire device, a latch for holding said member in its spindle advance position, means governed by said spindle for releasing said latch, and means governed by said spindle for returning said control member to neutral position.

17. In a screw machine, a reciprocably mounted slide, means for reciprocating said slide, a rotatable spindle mounted for axial sliding movement, means for advancing said spindle including a first normally disengaged clutch, means for retracting said spindle including a second normally disengaged clutch, and means for governing said clutches comprising an annular control ring having a neutral position wherein both clutches are disengaged, a position to one side of neutral wherein the first clutch is engaged, and a position to the other side of neutral wherein the second clutch is engaged, a shifter fork engaging said annular control ring to determine the position thereof, a load and fire device biased constantly to urge engagement of said first clutch, means actuated by said slide and acting through said shifter fork to effect engagement of said second clutch and to cock said load and fire device, a latch cooperable with said shifter fork for holding the same in cocked position, means governed by said spindle for releasing said latch after a predetermined advance of said spindle, and means governed by said spindle upon retraction thereof for returning said control member to neutral position.

18. In a screw machine, a reciprocably mounted slide, means for reciprocating said slide, a rotatable spindle mounted for axial sliding movement, means for advancing said spindle, means for retracting said spindle, and means for governing said spindle advancing and retracting means including a control member having a neutral position wherein both spindle shifting means are inoperative, a position to one side of neutral wherein the spindle advancing means is operative, and a position to the other side of neutral wherein the spindle retracting means is operative, and means actuated by said slide to position said control member in its spindle advance position including a rod having rack teeth formed therein and connected to said control member, a crank having a first arm terminating in teeth meshing with said rack and a second arm, a dog near the end of said second arm pivotally mounted to permit pivoting in one direction but restrained against pivoting in the opposite direction, and a dog carried by said slide and positioned to engage said pivoted dog during the advance of said slide in a manner to swing said crank and shift said control member from its neutral to its spindle advance position.

19. In a screw machine, a reciprocably mounted slide, means for reciprocating said slide, a rotatable spindle mounted for axial sliding movement, means for advancing said spindle, means for retracting said spindle, and means for governing said spindle advancing and retracting means including a control member having a neutral position wherein both spindle shifting means are inoperative, a position to one side of neutral wherein the spindle advancing means is operative, and a position to the other side of neutral wherein the spindle retracting means is operative, a bar operatively connected with said control member and having racks formed on opposite sides thereof, a first pinion providing means meshing with one of the racks on said bar, a second pinion providing means meshing with the other rack on said bar, a dog on said slide cooperable with said first pinion means during advance of said slide to shift said control member from its neutral to its spindle advancing position, and means actuated by said spindle upon return thereof to starting position to actuate said second pinion providing means to return said control member from its spindle retracting position to neutral.

20. In a screw machine, a reciprocably mounted slide, means for reciprocating said slide, a rotatable spindle mounted for axial sliding movement, means for advancing said spindle, means for retracting said spindle, and means for governing said spindle advancing and retracting means including a control member having a neutral position wherein both spindle shifting means are inoperative, a position to one side of neutral wherein the spindle advancing means is operative, and a position to the other side of neutral wherein the spindle retracting means is operative, a shifter fork having a yoke engaging said control member to shift the same to its various positions, an arm, a load and fire device engaged by said arm at its upper end and a latch block, means actuated by said slide to rock said shifter fork to the spindle advancing position of said control member and for cocking said load and fire device, a latch constantly urged toward engagement with said latch block and operable to hold said shifter fork with said control member in spindle advancing position, and means actuated by said spindle after a predetermined advance thereof to withdraw said latch and release said shifter fork to the action of said load and fire device for shifting said control member uninterruptedly from its spindle advancing position through neutral to its spindle retracting position.

21. In a screw machine, a reciprocably mounted slide, means for reciprocating said slide, a rotatable spindle mounted for axial sliding movement, means for advancing said spindle, means for retracting said spindle, and means for governing said spindle advancing and retracting means including a control member having a neutral position wherein both spindle shifting means are inoperative, a position to one side of neutral wherein the spindle advancing means is operative, and a position to the other side of neutral wherein the spindle retracting means is operative, a shifter fork having a yoke engaging said control member to shift the same to its various positions, an arm, a load and fire device engaged by said arm at its upper end and a latch block, means actuated by said slide to rock said shifter fork to the spindle advancing position of said control member and for cocking said load and fire device, a latch constantly urged toward engagement with said latch block and operable to hold said shifter fork with said control member in spindle advancing position, a dog operable to engage said latch and disengage the same from said latch block, and means for actuating said dog including a control rod extending parallel with said spindle and shiftable longitudinally, means carried by said spindle operable upon a predetermined advance of said spindle to shift said control rod, and a rock shaft having a pair of arms rigid therewith, one engaging said control shaft and the other connected to actuate said dog and proportioned to magnify the movement of said control rod.

22. In a screw machine, a reciprocably mounted slide, means for reciprocating said slide, a rotatable spindle mounted for axial sliding movement, means for advancing said spindle, means for retracting said spindle, and means for governing said spindle advancing and retracting means including a control member having a neutral position wherein both spindle shifting means are inoperative, a position to one side of neutral wherein the spindle advancing means is operative, and a position to the other side of neutral wherein the spindle retracting means is operative, a load and fire device operable to shift said control member from its spindle advancing position through neutral to its spindle retracting position, means actuated by said slide to position said control member in its spindle advancing position and to cock said load and fire device, latch means for holding said control member in its spindle advancing position and said load and fire device in cocked position, a control rod axially shiftable mounted parallel with said spindle, a pair of axially spaced collars on said control rod, a dog carried by said spindle disposed between said collars and positioned to engage one collar and shift said control rod in one direction as the spindle approaches the end of its advancing movement and to engage the other collar and shift said control rod in the opposite direction as the spindle approaches the end of its retracting movement, a rock shaft having a first arm rigid therewith and operatively associated with said control rod to be swung by movement of the rod, means for releasing said latch means including a second arm fixed on said rock shaft, and means for returning said control member from its spindle retracting to its neutral position including a third arm rigid with said rock shaft.

23. In a screw machine, a rotatably mounted lead screw, a spindle rotatably and reciprocably mounted and having threaded engagement with said lead screw, means constantly rotating one of said parts, means including a constantly engaged frictional drive connection which, when operating alone, rotates the other part at the same speed and in the same direction as said one part to prevent relative axial movement of said parts, and means engageable with said frictionally driven other part overriding its frictional drive and rotating said part at a different speed, thereby causing axial movement of the spindle.

24. In a screw machine, a rotatably mounted lead screw, a spindle rotatably and reciprocably mounted and having threaded engagement with said lead screw, means constantly rotating one of said parts, means including a constantly engaged frictional drive connection which, when operating alone, rotates the other part at the same speed and in the same direction as said one part to prevent relative axial movement of said parts, and means selectively engageable with the said frictionally driven other part overriding its frictional drive and rotating said part at a speed below that of the said one part, to produce axial movement of the spindle in one direction, or at a speed above that of said one part, to produce axial movement of the spindle in the opposite direction.

JUDSON H. MANSFIELD.